United States Patent
Asada et al.

[11] Patent Number: 5,810,480
[45] Date of Patent: Sep. 22, 1998

[54] VERTICAL HYDRODYNAMIC BEARING APPARATUS

[75] Inventors: Takafumi Asada; Hiroaki Saitoh; Tsutomu Hamada, all of Osaka, Japan

[73] Assignee: Matsushita Electric Industrial Co., Ltd., Japan

[21] Appl. No.: 866,223

[22] Filed: May 30, 1997

[30] Foreign Application Priority Data

Jun. 10, 1996 [JP] Japan ................................ 8-146949

[51] Int. Cl.⁶ .................................................... F16C 17/02
[52] U.S. Cl. ............................................................ 384/107
[58] Field of Search .................................... 384/115, 118, 384/114, 111, 113, 107

[56] References Cited

U.S. PATENT DOCUMENTS

| | | |
|---|---|---|
| 4,641,332 | 2/1987 | Gerkema . |
| 5,423,612 | 6/1995 | Zang ........................................ 384/119 |
| 5,427,456 | 6/1995 | Hensel ..................................... 384/112 |

FOREIGN PATENT DOCUMENTS 60-117531  6/1985  Japan .

*Primary Examiner*—Lenard A. Footland
*Attorney, Agent, or Firm*—Parkhurst & Wendel, L.L.P.

[57] ABSTRACT

A rotary shaft is inserted in a bearing bore of a sleeve with lubricant stored therebetween. Upper and lower groove patterns, spaced in a vertical direction for cooperatively generating a dynamic pressure when the rotary shaft rotates in the bearing bore, are formed on at least one of an outside surface of the rotary shaft and an inside surface of the bearing bore. The rotary shaft has a recessed portion in a region located between the upper and lower groove patterns for storing the lubricant therein. The recessed portion is asymmetrically tapered so that the lubricant stored in the recessed portion is chiefly circulated to the upper groove pattern against a gravity acting thereon when the rotary shaft rotates in the bearing bore, whereby the upper and lower groove patterns are uniformly lubricated.

5 Claims, 5 Drawing Sheets

VERTICAL HYDRODYNAMIC BEARING APPARATUS

BACKGROUND OF THE INVENTION

1. Field of the Invention

The present invention relates to a vertical fluid bearing apparatus preferably used for a polygon scanner motor that rotates at a high speed in a range of about 30 to 50 thousands revolutions per minute and is incorporated in laser beam printers or the like.

2. Prior Art

One example of the conventional vertical hydrodynamic bearing apparatus will be explained hereinafter with reference to FIGS. 4 and 5. A cylindrical sleeve 12, coupled in an opening of a base plate 11, has a bearing bore 12A extending in the axial direction thereof. A rotary shaft 13 is rotatably inserted in the bearing bore 12A. Upper and lower groove patterns 13A are formed on an outer cylindrical surface of the rotary shaft 13. These groove patterns 13A are spaced from each other in the axial direction of the rotary shaft 13 for generating a dynamic pressure. A thrust plate 14 is securely fixed to the bottom of the sleeve 12. An inside space defined by rotary shaft 13, bearing bore 12A and thrust plate 14 is filled with lubricant 15. A disk 16 is securely fixed to the upper end of rotary shaft 13. A rotor yoke 17 and a rotor magnet 18 are securely fixed to the disk 16. A motor stator 19 is provided outside the sleeve 12. A mirror 20A is engaged with the disk 16. A presser bar spring 20B is used to fix the mirror 20A.

An operation of the above-described conventional vertical hydrodynamic bearing apparatus will be explained hereinafter. When the motor stator 19 is activated, the rotor magnet 18 is rotated together with rotor yoke 17, disk 16, rotary shaft 13, mirror 20A and presser bar spring 20B. With this rotation the groove patterns 12B generates a dynamic pressure for giving a pumping force to the lubricant 15, so that the rotary shaft 13 can rotate without being brought into contact with the bearing bore 12A. Mirror 20A reflects and directs a laser beam (not shown) to a photosensitive drum (not shown) for recording signals thereon.

However, the above-described conventional arrangement has the following problem. As enlargedly shown in FIG. 5, when the rotary shaft 13 rotates at a higher speed equal to or exceeding 30 thousands revolutions per minute, temperature of lubricant 15 is possibly increased up to a higher temperature equal to or exceeding 120° C. due to heat generation from the motor stator 19 or from the bearing itself. The lubricant 15, when subjected to such a higher temperature, may be splashed out of the bearing 12 by a rotational force given from the rotary shaft 13 or may sag along the wall of bearing bore 12A due to an extraordinary reduction of viscosity under such a high temperature. The dynamic pressure generating groove patterns 13A, each formed into a herringbone gear configuration, may suffer from a lack of oil film especially at the upper part thereof (indicated by an arrow "A" in FIG. 5). Therefore, there is a possibility that the bearing may be subjected to serious frictions, such as rub, abrasion or seizure.

SUMMARY OF THE INVENTION

In view of the foregoing, a principal object of the present invention is to provide an excellent vertical hydrodynamic bearing apparatus capable of preventing lubricant from splashing away when the rotary shaft of the bearing apparatus rotates at a higher speed or from sagging due to its weight under a higher temperature condition where the viscosity is greatly reduced, thereby preventing a lack of oil film and a generation of abrasion or seizure.

In order to accomplish the above-described and other related objects, the present invention provides a novel vertical hydrodynamic bearing apparatus comprising a rotary shaft inserted in a bearing bore of a sleeve with lubricant stored therebetween. Upper and lower groove patterns, spaced in a vertical direction for cooperatively generating a dynamic pressure when the rotary shaft rotates in the bearing bore, are formed on at least one of an outside surface of the rotary shaft and an inside surface of the bearing bore. Furthermore, the rotary shaft has a recessed portion in a region located between the upper and lower groove patterns for storing the lubricant therein. Specifically, the recessed portion is asymmetrically tapered so that the lubricant stored in the recessed portion is chiefly circulated to the upper groove pattern against a gravity acting thereon when the rotary shaft rotates in the bearing bore, whereby the upper and lower groove patterns are uniformly lubricated.

According to the above-described arrangement of the present invention, the asymmetrically tapered recessed portion serves as a reservoir for lubricant. The lubricant adhering on the tapered surface is subjected to a centrifugal force when the rotary shaft rotates in the bearing bore and is therefore conveyed upward along the tapered surface and effectively circulated to the upper groove pattern. Thus, both of the dynamic pressure generating groove patterns located above and below the asymmetrically tapered recessed portion can be always lubricated by a sufficient amount of oil film.

Preferably, the recessed portion is chiefly constituted by a primary tapered portion having a diameter taking a larger value at an arbitrary position than at other position lower than the arbitrary position. It is also preferable that the rotary shaft has an auxiliary tapered portion in addition to the primary tapered portion. The auxiliary tapered portion is provided at a region opposed to at least one of upper and lower ends of the sleeve, with a diameter of the auxiliary tapered portion taking a smaller value at an arbitrary position than at other position closer to the groove patterns.

Moreover, it is preferable that the recessed portion is chiefly constituted by a tapered portion provided adjacent to the upper groove pattern.

Furthermore, it is preferable that the recessed portion is constituted by a combination of upper and lower tapered surfaces inclined oppositely and placed side by side in the vertical direction, and an axial width of the upper tapered surface is longer than an axial width of the lower tapered surface.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
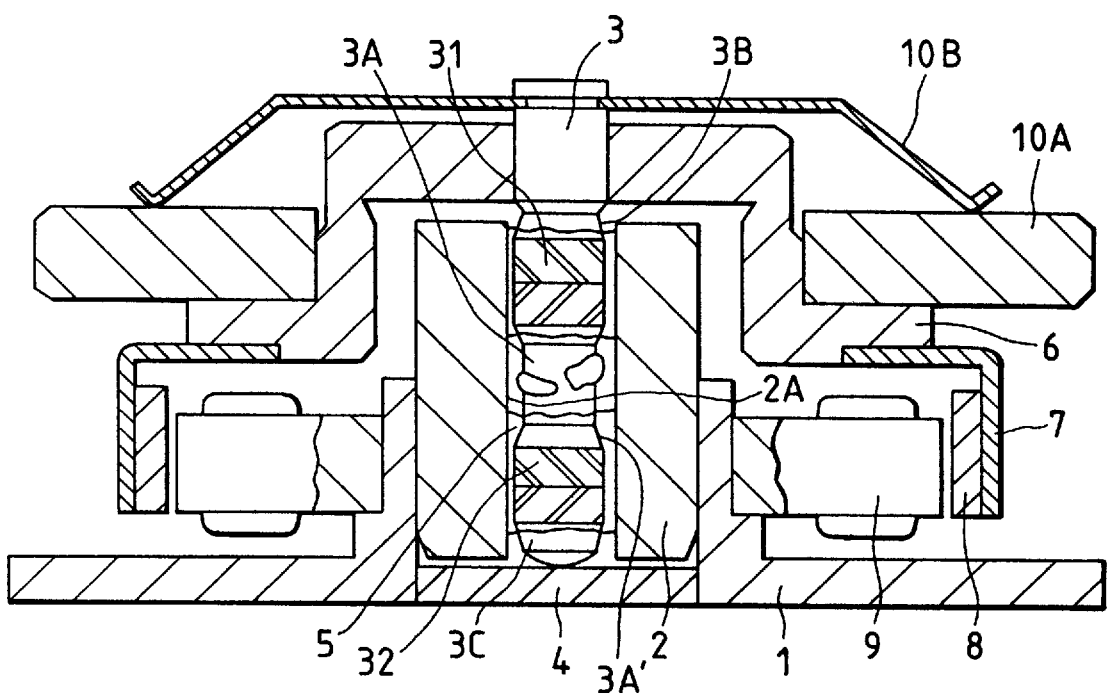
FIG. 1 is a cross-sectional view showing a vertical hydrodynamic bearing apparatus in accordance with a preferred embodiment of the present invention.

Preferred embodiments of the present invention will be explained with reference to the accompanying drawing. Identical parts are denoted by the same reference numerals throughout the drawing.

Figure 2:
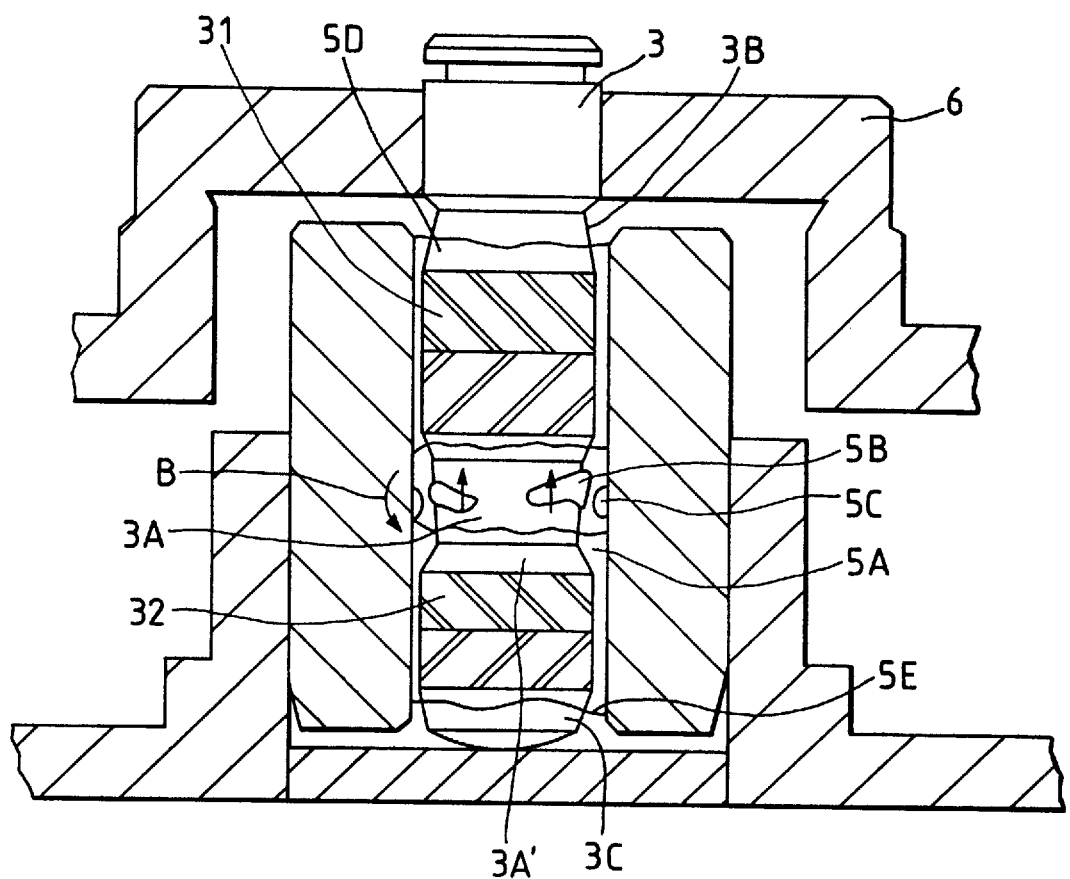
FIG. 2 is a cross-sectional view showing an essential part of the vertical hydrodynamic bearing apparatus shown in FIG. 1.

A preferable embodiment of the present invention will be explained hereinafter with reference to FIGS. 1 and 2. FIG. 1 is a cross-sectional view showing a vertical hydrodynamic bearing in accordance with a preferred embodiment of the present invention. In FIG. 1, a housing 1 is provided for securely supporting or fixing a sleeve 2. A bearing bore 2A is formed in the sleeve 2 so as to extend in the axial direction thereof. A rotary shaft 3 is rotatably inserted in the bearing bore 2A. Upper and lower groove patterns 31 and 32, generating a dynamic pressure, are provided on an outer cylindrical surface of rotary shaft 3. The lower end of rotary shaft 3 is brought into contact with a thrust plate 4 attached to the opening of housing 1. A disk 6 is fixed to the upper end of rotary shaft 3. A mirror 10A is attached on the disk 6 by a presser bar spring 10B.

A primary tapered portion 3A is provided on the outer cylindrical surface of rotary shaft 3, at a central region extending between the upper dynamic pressure generating groove pattern 31 and the lower dynamic pressure generating groove pattern 32. More specifically, an annual recess is formed in the central region, sandwiched between upper and lower dynamic pressure generating groove patterns 31 and 32, on the inner cylindrical surface of rotary shaft 3. The annual recess is constituted by a combination of the primary tapered portion 3A and an opposite tapered portion 3A'. Tapered surfaces of primary tapered portion 3A and opposite tapered portion 3A' are inclined oppositely and placed side by side. The axial width of the primary tapered portion 3A is longer than that of the opposite tapered portion 3A'. The primary tapered portion 3A is located adjacent to the upper dynamic pressure generating groove pattern 31. The opposite tapered portion 3A' is located adjacent to the lower dynamic pressure generating groove pattern 32.

The diameter of the primary tapered portion 3A varies along the axial direction of the rotary shaft 3, so as to take a larger value at an arbitrary position than at any other position lower than this arbitrary position. In other words, the diameter of the primary tapered portion 3A increases in the upward direction.

A secondary tapered portion 3B is provided at an upper-end region of the rotary shaft 3 opposed to an upper end of the bearing bore 2A. Another secondary tapered portion 3C is provided at a lower-end region of the rotary shaft 3 opposed to a lower end of the bearing bore 2A. The diameter of each secondary tapered portion 3B or 3C varies along the axial direction of rotary shaft 3 in these end regions extending from the upper and lower ends of bearing bore 2A to the dynamic pressure generating groove patterns 31 and 32, so as to take a smaller value at an arbitrary position than at any other position closer to the dynamic pressure generating groove patterns 31 and 32. In other words, the diameter of the secondary tapered portion 3B increases in the downward direction, while the diameter of the other secondary tapered portion 3C increases in the upward direction.

An inside space, defined by the dynamic pressure generating groove patterns 31, 32, the primary tapered portion 3A and the secondary tapered portions 3B, 3C, is filled with lubricant 5. A rotor yoke 7 and a rotor magnet 8 are attached to the disk 6 so as to rotate together with mirror 10A and presser rod spring 10B. A motor stator 9 is attached to the housing 1.

An operation of the above-described vertical hydrodynamic bearing apparatus will be explained hereinafter. When the motor stator 9 is activated, the rotor magnet 8 is given a rotational force and rotates together with rotor yoke 7, disk 6, rotary shaft 3, mirror 10A and presser bar spring 10B. With this rotation, the upper and lower dynamic pressure generating groove patterns 31 and 32 cooperatively give a pumping pressure to the lubricant 5, so that the rotary shaft 3 can rotate without being brought into contact with the bearing bore 2A. In this case, as enlargedly shown in FIG. 2, a sufficient amount of lubricant 5A adheres to the rotary shaft 3 in the region corresponding to primary tapered portion 3A. Lubricant 5D is stored in the region corresponding to secondary tapered portion 3B, while lubricant 5E is stored in the region corresponding to secondary tapered portion 3C.

However, when the rotary shaft 3 rotates at a higher speed, lubricant tends to run along the inner cylindrical surface of bearing bore 2A as indicated by reference numeral 5C and sag in the direction of an arrow B due to its weight. In this case, the arrangement of primary tapered portion 3A formed on the rotary shaft 3 makes it possible to convey the lubricant upward, as indicated by reference numeral 5B, along the axial direction of the rotary shaft 3, i.e., from the smaller diameter portion to the larger diameter portion of the primary tapered portion 3A, when a centrifugal force acts on the lubricant. Thus, the lubricant can be circulated to the upper dynamic pressure generating groove pattern 31 located above the primary tapered portion 3A. Meanwhile, lubricants 5D and 5E, stored in the regions corresponding to the secondary tapered portions 3B and 3C, are conveyed to the dynamic pressure generating groove patterns 31 and 32 along respective tapered portions. Mirror 10A, when rotating, reflects a laser beam emitted from a light-emitting element (not shown) to direct the laser beam to a photosensitive drum (not shown) for recording signals thereon.

According to the above-described arrangement of the present invention, the dynamic pressure generating groove patterns can be lubricated sufficiently even when the rotary shaft is rotating at a higher speed equivalent to 30 to 50 thousands revolutions per minute. Accordingly, the stability in the rotation of a vertical hydrodynamic bearing apparatus can be assured for a long-lasting time.

Figure 3:
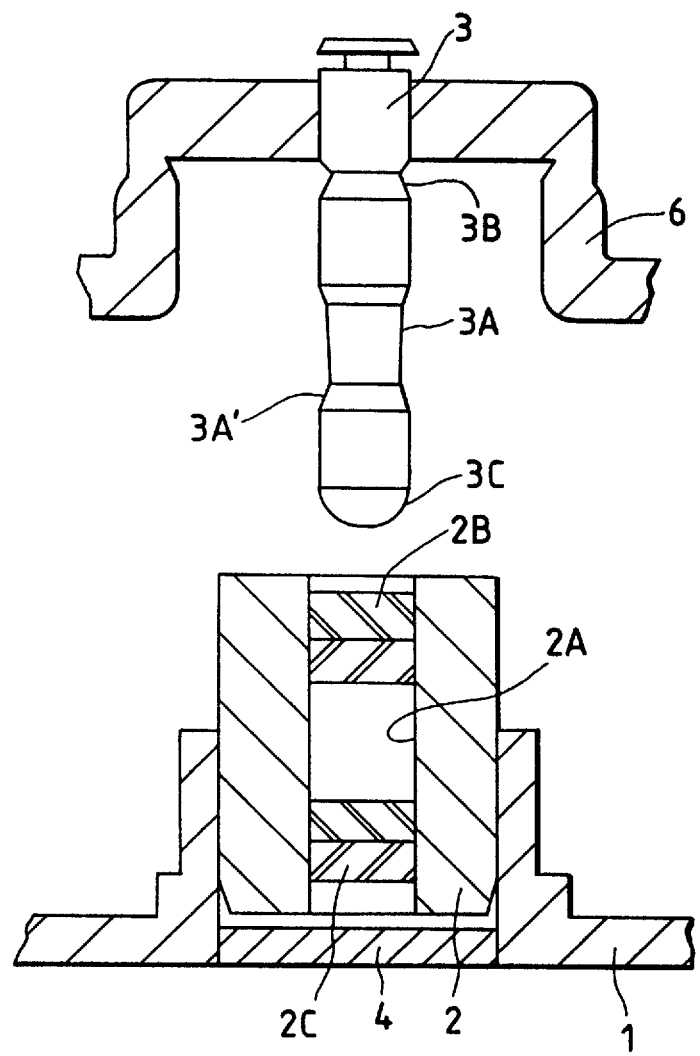
FIG. 3. is a cross-sectional view showing an essential part of a vertical hydrodynamic bearing apparatus in accordance with another embodiment of the present invention.
Figure 4:
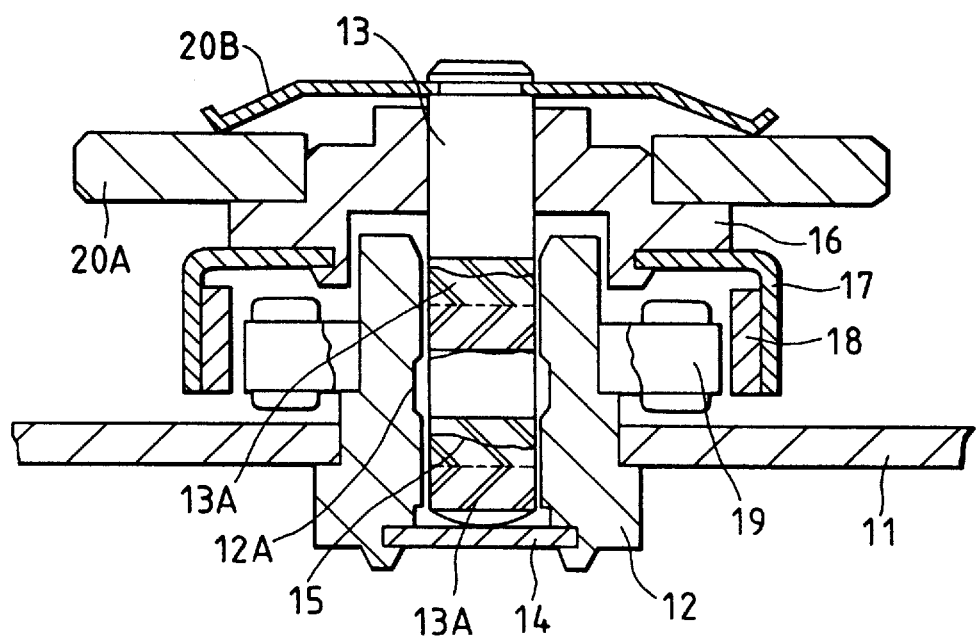
FIG. 4 is a cross-sectional view showing a conventional vertical hydrodynamic bearing apparatus.
Figure 5:
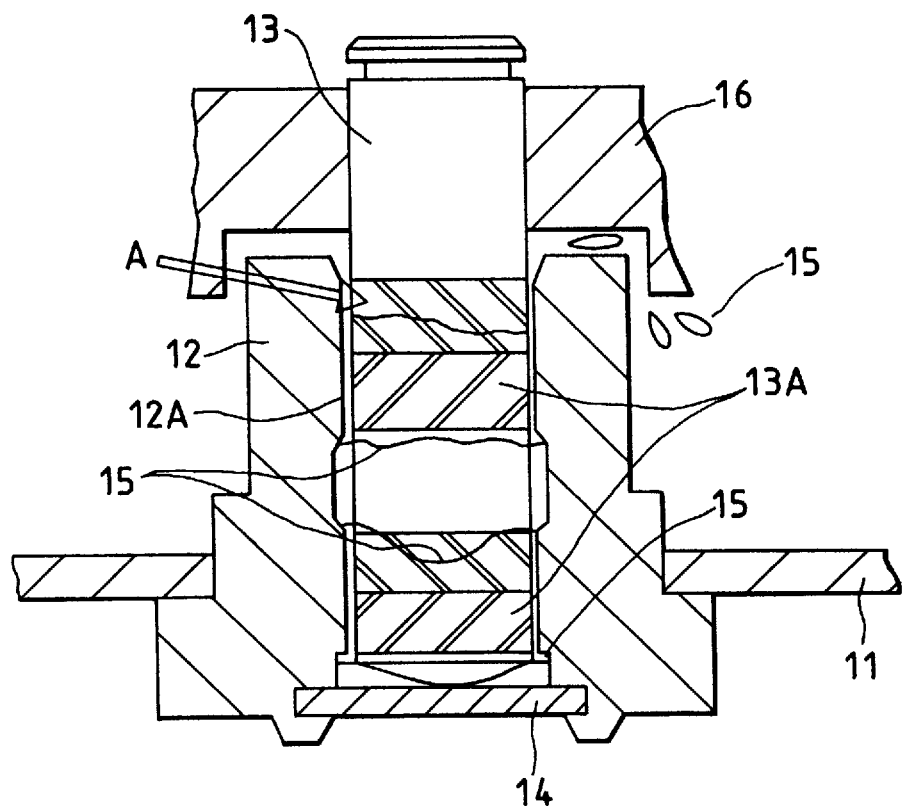
FIG. 5 is a cross-sectional view showing an essential part of the conventional vertical hydrodynamic bearing apparatus shown in FIG. 4.

According to the above-described embodiment, the dynamic pressure generating groove patterns 31 and 32 are formed on the outer cylindrical surface of the rotary shaft 3. Alternatively, it is possible to form the same on the inner cylindrical surface of the sleeve 2, as shown in FIG. 3; namely, upper and lower dynamic pressure generating groove patterns 2B and 2C are formed on the cylindrical surface of the bearing bore 2A. The same effect can be obtained.

Furthermore, according to the above-described embodiment, the sleeve 2 and the housing 1 are formed separately. However, it is of course possible to manufacture them as an integrated component, such as a press working product, a die casting product or else.

Yet further, according to the above-described embodiment, both of primary and secondary tapered portions are provided. However, substantially the same effect can be obtained even when only the primary tapered portion is provided.

As apparent from the foregoing description, the present invention provides a novel vertical hydrodynamic bearing apparatus comprising a rotary shaft inserted in a bearing bore of a sleeve with lubricant stored therebetween. Upper and lower groove patterns, spaced in a vertical direction for cooperatively generating a dynamic pressure when the rotary shaft rotates in the bearing bore, are formed on at least one of an outside surface of the rotary shaft and an inside surface of the bearing bore. Furthermore, the rotary shaft has a recessed portion in a region located between the upper and lower groove patterns for storing the lubricant therein. Specifically, the recessed portion is asymmetrically tapered so that the lubricant stored in the recessed portion is chiefly circulated to the upper groove pattern against a gravity acting thereon when the rotary shaft rotates in the bearing bore, whereby the upper and lower groove patterns are uniformly lubricated.

As explained in the foregoing description, by the function of the asymmetrically-recessed tapered portion thus arranged, lubricant can be conveyed upward and surely circulated to the dynamic pressure generating groove patterns. Accordingly, the rotation of the vertical hydrodynamic bearing can be stabilized for a long-lasting time.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and abounds of the claims, or equivalents of such metes and bounds, are therefore intended to be embraced by the claims.

What is claimed is:

1. A vertical hydrodynamic bearing apparatus comprising a rotary shaft inserted in a bearing bore of a sleeve with lubricant stored therebetween, wherein
   upper and lower groove patterns, spaced in a vertical direction for cooperatively generating a dynamic pressure when said rotary shaft rotates in said bearing bore, are formed on at least one of an outside surface of said rotary shaft and an inside surface of said bearing bore;
   said rotary shaft has a recessed portion in a region located between said upper and lower groove patterns for storing the lubricant therein, said recessed portion is asymmetrically tapered so that the lubricant stored in said recessed portion is chiefly circulated to said upper groove pattern against a gravity acting thereon when said rotary shaft rotates in said bearing bore, whereby said upper and lower groove patterns are uniformly lubricated.

2. A vertical hydrodynamic bearing apparatus comprising:
   a sleeve with a bearing bore extending in an axial direction thereof;
   a rotary shaft inserted in said bearing bore of said sleeve;
   at least two sets of dynamic pressure generating groove patterns formed on at least one of an inside surface of said bearing bore and an outside surface of said rotary shaft;
   said rotary shaft having a recessed portion in a region located between said two sets of dynamic pressure generating groove patterns, said recessed portion being chiefly constituted by a primary tapered portion having a diameter taking a larger value at an arbitrary position than at other position lower than said arbitrary position; and
   surfaces of said primary tapered portion and said two sets of dynamic pressure generating groove patterns being filled with lubricant.

3. The vertical hydrodynamic bearing apparatus in accordance with claim 2, wherein said rotary shaft has an auxiliary tapered portion in addition to said primary tapered portion, said auxiliary tapered portion is provided at a region opposed to at least one of upper and lower ends of said sleeve, with a diameter of said auxiliary tapered portion taking a smaller value at an arbitrary position than at other position closer to said dynamic pressure generating groove patterns, and surfaces of said primary and secondary tapered portions and said two sets of dynamic pressure generating groove patterns are filled with said lubricant.

4. A vertical hydrodynamic bearing apparatus comprising:
   a sleeve with a bearing bore extending in an axial direction thereof;
   a rotary shaft inserted in said bearing bore of said sleeve; and
   upper and lower groove patterns for generating a dynamic pressure when said rotary shaft rotates in said bearing bore, formed separately on at least one of an inside surface of said bearing bore and an outside surface of said rotary shaft, wherein
   said rotary shaft has a recessed portion in a region located between said upper and lower groove patterns, and said recessed portion is chiefly constituted by a tapered surface provided adjacent to said upper groove pattern.

5. A vertical hydrodynamic bearing apparatus comprising:
   a sleeve with a bearing bore extending in an axial direction thereof;
   a rotary shaft inserted in said bearing bore of said sleeve; and
   upper and lower groove patterns for generating a dynamic pressure when said rotary shaft rotates in said bearing bore, formed separately on at least one of an inside surface of said bearing bore and an outside surface of said rotary shaft,
   wherein said rotary shaft has a recessed portion in a central region located between said upper and lower groove patterns, said recessed portion is constituted by a combination of upper and lower tapered surfaces inclined oppositely and placed side by side in a vertical direction, and an axial width of said upper tapered surface is longer than an axial width of said lower tapered surface.

* * * * *